(12) United States Patent
Barry

(10) Patent No.: US 9,974,237 B2
(45) Date of Patent: May 22, 2018

(54) THRESHING CORN HEADER WITH SCREW CROP CONVEYORS

(71) Applicant: CNH INDUSTRIAL AMERICA, LLC, New Holland, PA (US)

(72) Inventor: John Barry, Falls Church, VA (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/877,514

(22) Filed: Oct. 7, 2015

(65) Prior Publication Data

US 2017/0099775 A1 Apr. 13, 2017

(51) Int. Cl.
*A01D 45/02* (2006.01)
*A01F 11/06* (2006.01)

(52) U.S. Cl.
CPC ............ *A01F 11/06* (2013.01); *A01D 45/028* (2013.01)

(58) Field of Classification Search
CPC .... A10D 45/021; A10D 45/025; A10D 45/02; A10D 47/00; A10D 43/10
USPC ...................................... 56/104, 110; 460/45
See application file for complete search history.

(56) References Cited

U.S. PATENT DOCUMENTS

| 309,462 | A | | 12/1884 | Hopper |
|---|---|---|---|---|
| 439,203 | A | | 10/1890 | Spaulding |
| 1,869,269 | A | | 7/1932 | Miller |
| 2,484,802 | A | * | 10/1949 | Aasland ................. A01D 43/10 |
| | | | | 171/57 |
| 2,870,593 | A | | 1/1959 | Anderson |
| 2,927,414 | A | * | 3/1960 | Jones .................... A01D 45/025 |
| | | | | 460/29 |
| 3,304,702 | A | * | 2/1967 | Russell ................ A01D 45/025 |
| | | | | 56/104 |
| 3,333,405 | A | | 8/1967 | Bulin |
| 3,858,384 | A | * | 1/1975 | Maiste ................. A01D 45/025 |
| | | | | 56/104 |
| 4,219,990 | A | * | 9/1980 | Hill ...................... A01D 45/025 |
| | | | | 56/104 |
| 7,395,649 | B2 | | 7/2008 | Wubbels et al. |
| 8,181,434 | B2 | * | 5/2012 | Rottinghaus ......... A01D 45/021 |
| | | | | 56/110 |

(Continued)

FOREIGN PATENT DOCUMENTS

| DE | 19527698 A1 | 2/1997 |
|---|---|---|
| DE | 10232802 A1 | 2/2004 |
| FR | 1448547 A | 1/1966 |

*Primary Examiner* — Arpad Fabian-Kovacs
(74) *Attorney, Agent, or Firm* — Peter K. Zacharias; Patrick M. Sheldrake

(57) ABSTRACT

A non-row sensitive corn threshing header comprising a forwardly disposed cutting apparatus for severing standing corn crop from the ground and a rearwardly disposed threshing apparatus for separating kernels from the plant, collecting the kernels, and discarding the remaining plant. The threshing apparatus includes a plurality of screw auger conveyors arranged in upper and lower planes that receive the crop and urge the crop into diminishing space between adjacent auger conveyors, the space defined by the auger flighting and the expandingly tapered auger shanks. Kernels are separated from the cob as the ears are urged rearwardly in the threshing apparatus. The header may include screens and the like for cleaning the grain of chaff prior to transferring to on-board storage or chaff removal may occur after the grain is off-loaded from the harvester.

15 Claims, 3 Drawing Sheets

(56) References Cited

U.S. PATENT DOCUMENTS

| | | | |
|---|---|---|---|
| 8,402,727 B2* | 3/2013 | Carboni | A01D 45/021 |
| | | | 56/60 |
| 9,210,842 B2* | 12/2015 | Lohrentz | A01D 45/025 |
| 2012/0190414 A1* | 7/2012 | Cressoni | A01D 45/021 |
| | | | 460/29 |
| 2014/0083073 A1 | 3/2014 | Doerscher, Sr. | |

* cited by examiner

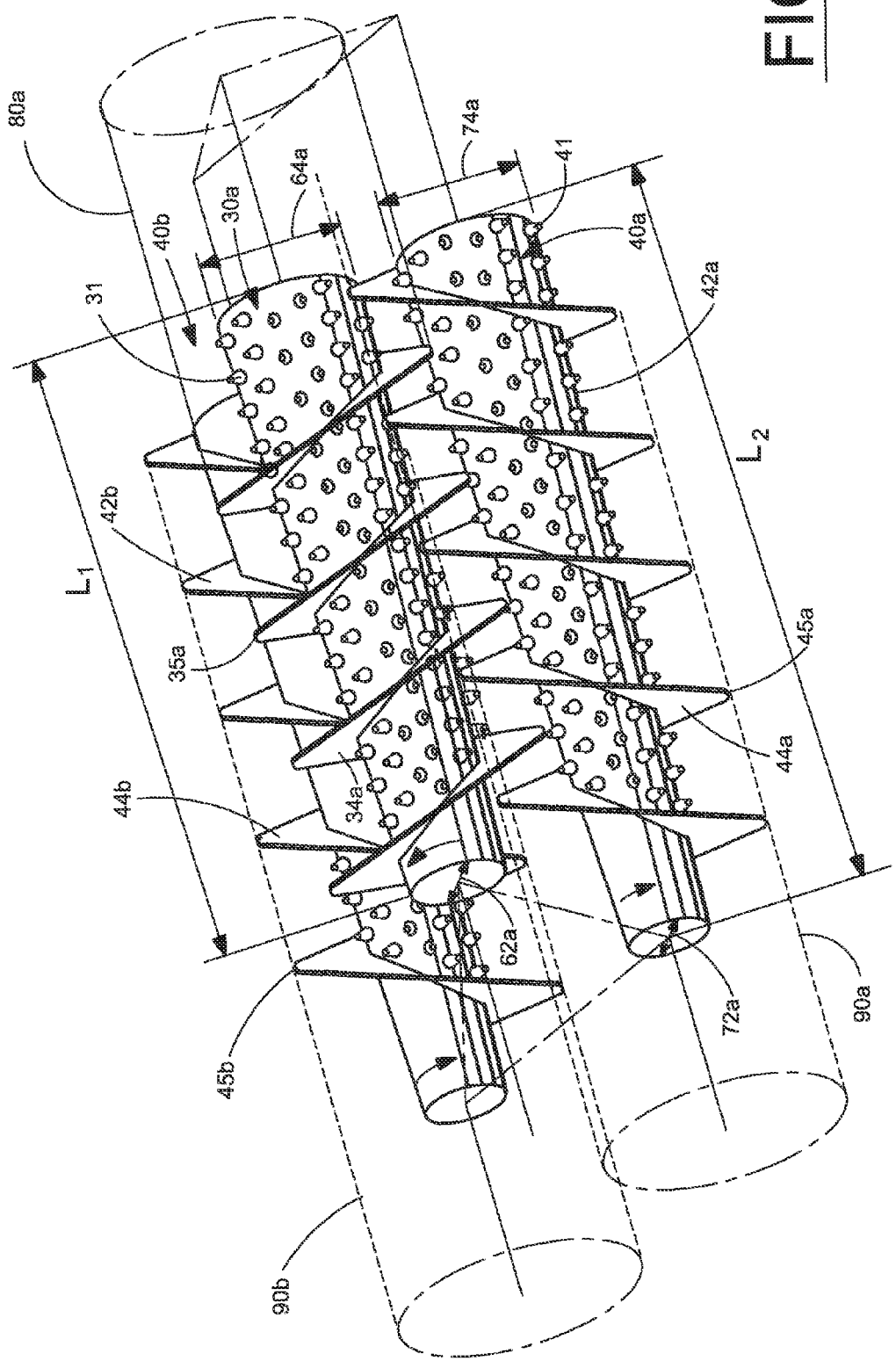

THRESHING CORN HEADER WITH SCREW CROP CONVEYORS

BACKGROUND OF THE INVENTION

The present invention relates generally to agricultural machines having processing apparatus for harvesting standing crops, and, more particularly to a corn threshing header configured to be non-row sensitive.

Known production chopping corn headers waste energy in the process of removing the ear from the stalk, transferring the ear to the feeder house, and in the row-aligned cutting of the stalk. Additionally, there are structures on the corn header that function only under certain crop conditions and that could be eliminated in an altered threshing process.

The function of row dividers and hoods is only necessary in instances of damage to the corn stalk. When the corn is uniformly planted in evenly-spaced straight rows and remains standing (undamaged) and the automatic feed system is properly functioning, the row dividers serve no purpose. Further, the row dividers forward position on the header usually means they are among the first components damaged if the header is run aground.

Hoods cover the header mechanism to minimize build-up of crop and crop debris generated during the ear-stripping process that could reduce mechanical function. The hoods further prevent loss of kernels dislodged the ears impact the deck plates as stalk are drawn into the header.

Gathering chains move ears from the position at which they are stripped from the stalk to an auger. Gathering chains comprise a specialized chain having paddles mounted thereon, drive and idler sprockets, a tensioning apparatus, and a drive apparatus typically including a shaft and a variable-speed hydraulic driver. Two such gathering chains are required for each corn row fed into the header. The result is a complex and inefficient system.

Stalk rolls engage the stalks and pull them downward so that the ears impact a deck plate and are detached from the stalk. The rolls each comprise a rotating helical member driven by a shaft with knives attached thereto, and a drive apparatus to rotationally drive the rolls. Each row requires a pair of stalk rolls. As with the gathering chains, the result is an overly complex and inefficient system to perform such a limited function.

A cross auger laterally moves the stripped ears from each row toward the center of the header. The configuration of the auger is such that kernels dislodged from the ear during the stripping operation may not be engaged and thus conveyed to the center of the header where they can be gathered by the harvesting machine. This allows stray kernels to gather in outboard recesses of the header resulting in both loss of grain and increased debris accumulation in the header.

A corn harvesting header that could refine or eliminate some or all of these inefficient apparatus from the header would be of great benefit. Further, a header capable of harvesting corn planted in a random arrangement in a field instead of uniformly spaced-apart rows could improve overall crop production efficiency by allowing greater crop density and less intensive planting requirements.

SUMMARY OF THE INVENTION

Accordingly, the present invention, in any of the embodiments described herein, may provide one or more of the following advantages:

It is an object of the present invention to provide a corn threshing header that allows gathering of corn stalks, regardless of the orientation on the ground, and feeding into a threshing mechanism to separate corn kernels from the cob. The header includes a forwardly disposed, non-row sensitive cutting apparatus for severing stalks from the ground and allowing the entire stalk and ear to be collected in the header. Pluralities of screw auger conveyors arranged in upper and lower planes receive the crop and urge the crop between converging surfaces defined by the screw flighting and expandingly tapered auger shanks separate the kernels from the remainder of the plant. Kernels are gathered below the conveyors while stalks and chaff is discharged at the rear of the auger conveyors where it is allowed to fall to the ground.

It is a further object of the present invention to provide a corn threshing header that eliminates the need for row dividers, hoods, gathering chains, and stalk rolls by incorporating a transversely arrange cutting apparatus generally spanning the header width and a plurality of threshing rolls configured to accept the crop regardless of orientation in which it enters the rolls. Pluralities of screw auger conveyors arranged in upper and lower planes receive the crop and urge the crop between converging surfaces defined by the screw flighting and expandingly tapered auger shanks. Conveyors in the lower plane extend further forwardly that those in the upper plane to provide a crop entry area. A deck plate disposed ahead of the auger conveyors could be used to detach the ear from the stalk.

It is a still further object of the present invention to provide a non-row sensitive corn threshing header that incorporates simplified cutting and threshing mechanisms that reduce weight and input power requirements thereby contributing to improvement of harvesting machine efficiency.

It is a still further object of the present invention to provide a corn threshing header that is capable of separating kernel from the plant thereby allowing elimination of a threshing apparatus from the prime mover.

It is a still further object of the present invention to provide a non-row sensitive corn threshing header that is durable in construction, inexpensive of manufacture, carefree of maintenance, easily assembled, and simple and effective to use.

These and other objects are achieved by providing a non-row sensitive corn threshing header comprising a forwardly disposed cutting apparatus for severing standing corn crop from the ground and a rearwardly disposed threshing apparatus for separating kernels from the plant, collecting the kernels, and discarding the remaining plant. The threshing apparatus includes a plurality of screw auger conveyors arranged in upper and lower planes that receive the crop and urge the crop into diminishing space between adjacent auger conveyors, the space defined by the auger flighting and the expandingly tapered auger shanks. Kernels are separated from the cob as the ears are urged rearwardly in the threshing apparatus. The header may include screens and the like for cleaning the grain of chaff prior to transferring to on-board storage or chaff removal may occur after the grain is off-loaded from the harvester.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a partial perspective view of the relationship of the auger conveyors in the threshing apparatus.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
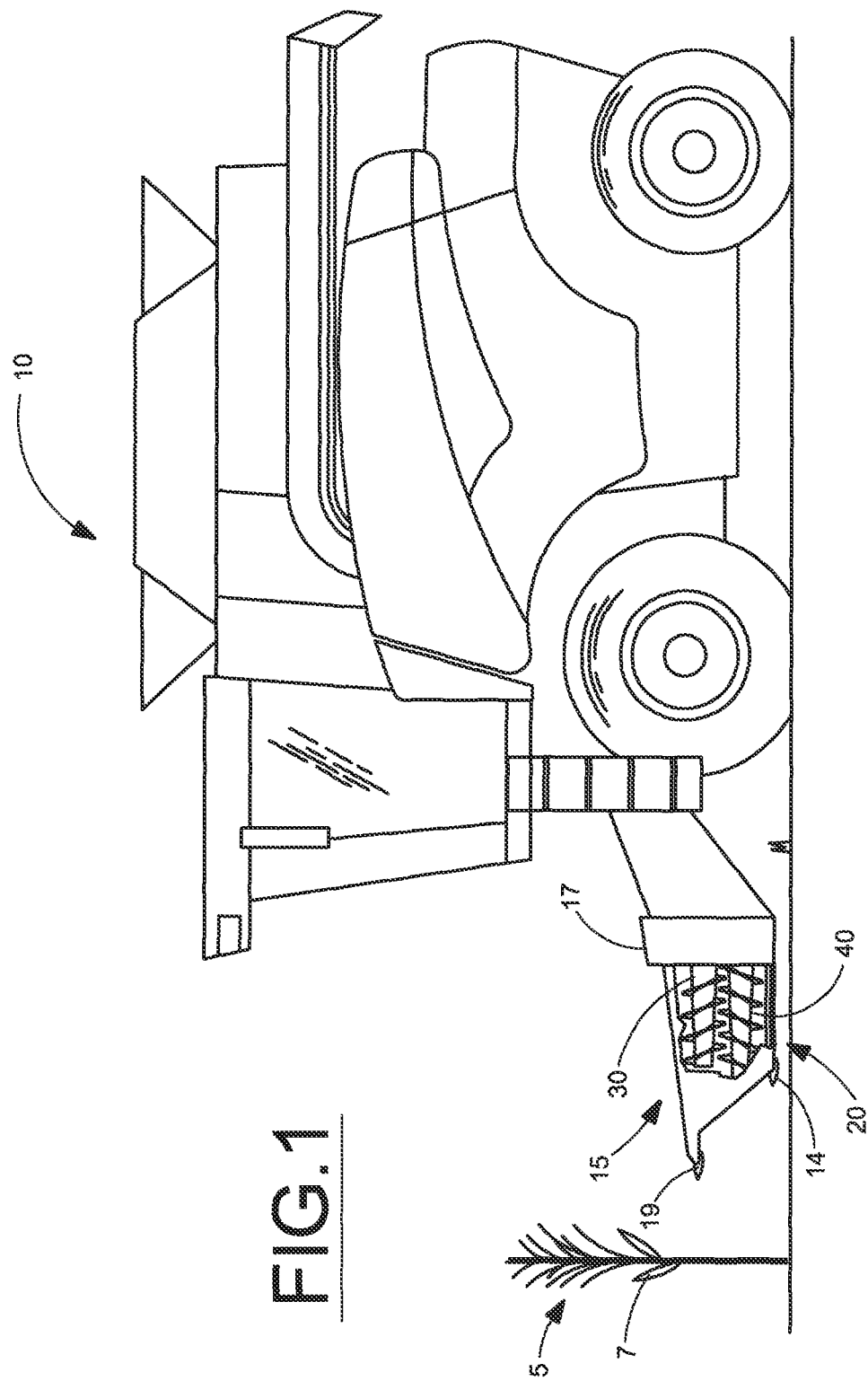
FIG. 1 is a side view of an agricultural harvesting machine, which is a combine, including a corn threshing header embodying aspects of the present invention.
Figure 3:
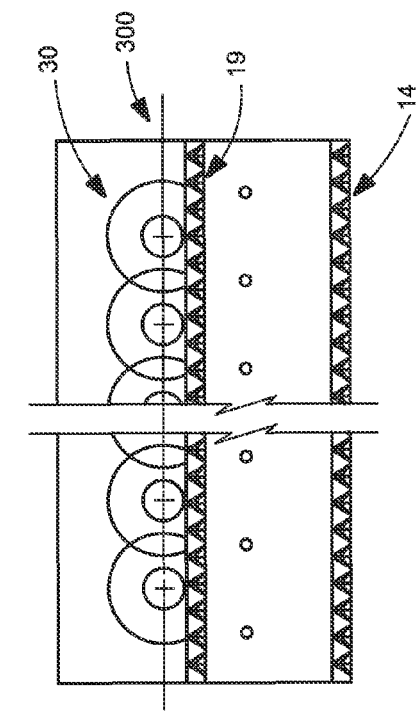
FIG. 3 is a partial front elevation view of the threshing apparatus of FIG. 2 taken along section line 3-3.
Figure 2:
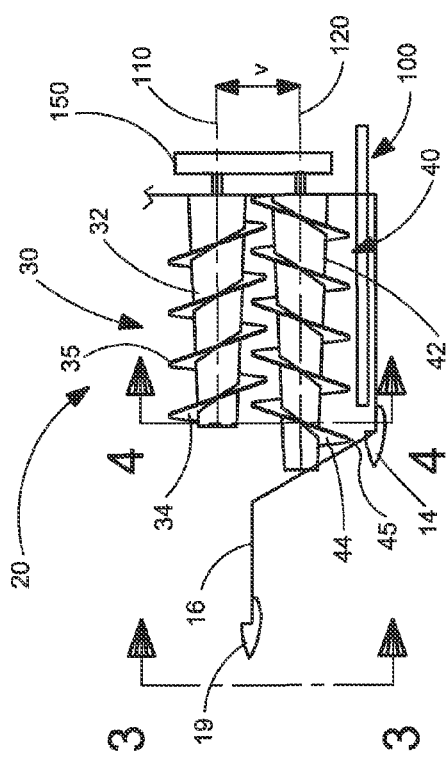
FIG. 2 is a partial side elevation view of the threshing apparatus of the present invention.

Referring to the figures, FIG. 1 illustrates a conventional agricultural machine, a crop harvester 10 in this instance, having a forwardly mounted header 15 for processing a standing crop 5 as the harvester moves forwardly across a field. The header 15 of the instant invention includes a forwardly disposed severing apparatus 19 and rearwardly disposed threshing apparatus 20 for separating grains from the severed crop. The exemplar header is suitable for harvesting corn, but may be adapted for other crops requiring a threshing operation to obtain the desired grain from the crop. By incorporating a threshing apparatus into the header, a simplified harvesting machine may be employed. The harvester 10 illustrated is preferably a combine harvester having at least the capability to receive and temporarily store threshed grain from the header or threshing apparatus. Other alternatives include the use of a tractor to propel and power the threshing header and a conveyor to move the threshed grain to a towed collection wagon or the like.

The header comprises a frame 17 for connecting to the harvester and for supporting various components of the header mechanism. The connection to the harvester enables up and down movement as well as adjustment of the for-aft tilt of the header to optimize the angle of approach of the header in relation to the crop.

For use in corn harvesting operations, the severing apparatus 19 may be vertically positioned at a height above the ground that is just below the normal elevation at which ears 7 may be expected on the stalk, generally thirty-six inches or more compared to a more conventional stalk severing height of eight to twelve inches. Severing the stalk at an elevated location above the ground surface reduces the volume of non-grain bearing crop material (stalk) entering the threshing apparatus 20. An additional chopping apparatus 14 may be provided and positioned at a more conventional elevation above the ground to sever the remaining portion of the stalk at a location closer to the ground surface to facilitate gathering of the stalks.

The cutting apparatus 19 is configured to sever a standing crop at any position within the transverse extent of the cutting apparatus. The capability to sever the standing crop at any lateral position along the cutting apparatus eliminates row sensitivity that is common in corn harvesting headers. Further, a full-width cutting apparatus allows elimination of many of the conventional mechanism for directing a row crop into discreet severing locations on the header. The cutting apparatus 19 may be a mechanical style cutter such as a sickle-bar or rotary cutter of the type that is normally used for grasses. A continuous loop saw apparatus spanning the forward end of the header may also be used. Non-mechanical devices such as pneumatic or hydraulic knives (high pressure streams) directed transversely may also be used to sever the standing crop.

Referring to FIGS. 2 through 5, the threshing header 15 includes a threshing apparatus 20 having a plurality of upper and lower screw auger type conveyors 30, 40 arranged in a upper and lower laterally extending arrays 300, 400, the upper and lower arrays each extending generally transverse across the width of the header 15. Each conveyor 30, 40 in the arrays is aligned on a respective generally fore-aft rotational axis 110, 120. Each conveyor 30, 40 is in the form of an Archimedean screw having an elongate central shank portion 32, 42 concentrically arranged about the respective rotational axis 110, 120 and a spirally arranged flight member 34, 44 outwardly extending therefrom. The central shank portion 32, 42 is tapered, having a forward diameter 62, 72 that increases in the direction of fore to aft to a rearward diameter 64, 74. The flight members 34, 44 each include a peripheral end 35, 45 that during rotation of the respective conveyor defines a generally cylindrical boundary 80, 90.

The upper conveyors 30 of the upper array 300 are laterally spaced apart (horizontal spacing $H_1$) and arranged so that the cylindrical boundaries 80 of adjacent upper conveyors overlap while maintaining the rearward diameters 64 slightly spaced apart. Similarly, the lower conveyors 40 of the lower array are laterally spaced apart (horizontal spacing $H_2$) and arranged so that the cylindrical boundaries 90 of adjacent lower conveyors 40 overlap while maintaining the rearward diameters 74 slightly spaced apart. In the event that the upper and lower conveyors 30, 40 have flight members 34, 44 defining similarly sized cylindrical boundaries 80, 90, then the upper and lower horizontal spacing may be equal.

Vertical spacing (V) between the upper and lower arrays 300, 400 is configured so that the cylindrical boundaries 80, 90 of adjacent upper and lower conveyors 30, 40 also overlap while maintaining an open space between the adjacent upper and lower rearward diameters 64, 74. The overlapping cylindrical boundaries 80, 90 preclude movement of crop material around the conveyors and force the crop into contact with the conveyors 30, 40.

Figure 4:
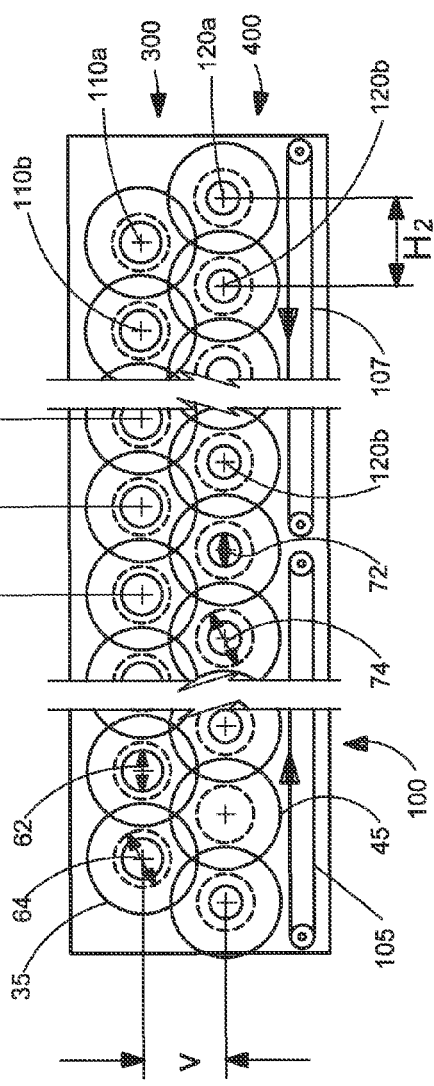
FIG. 4 is a partial front elevation view of the threshing apparatus of FIG. 2 taken along section line 4-4.

Referring specifically to FIG. 4, the lateral positioning of the upper and lower rotational axes 110, 120 is laterally offset to so that an upper rotational axis 110a is laterally positioned between two adjacent lower rotational axis 120a, 120b. The lateral offset may be such that an adjacent upper rotational axis 110a is positioned midway between two adjacent lower rotational axes 120a, 120b. By offsetting the upper and lower conveyors, crop paths are defined between three adjacent conveyors, either two upper and one lower or two lower and one upper.

The fore aft lengths of the upper conveyors 30 and the lower conveyors 40 may be altered so that the lower conveyors 40 extend more forwardly than the upper conveyors 30 to provide a receiving area for crop entering the threshing apparatus 20. Shrouding 16 or the like extending rearwardly from the crop severing apparatus 19 provides a platform for supporting and guiding the severed crop to the threshing apparatus 20. The shrouding 16 is preferably configured to guide rearward moving crop onto the lower, forwardly extending lower array 400.

The upper and lower arrays 300, 400 are configured to counter rotate in which the upper conveyors 30 each rotate in first direction while the lower conveyors 40 each rotate in an opposite direction. A drive mechanism 150 is provided to rotate the conveyors 30, 40, preferably receiving motive power from the harvester 10. Drive mechanisms suitable for the application are well known in the art and not discussed in further detail herein. The helical arrangement of the flight members 34, 44 on the upper and lower conveyors is configured so that crop movement is from fore to aft as the conveyors 30, 40 rotate. The rotational position of all conveyors is synchronized to prevent interference between the flight members of the upper and lower conveyors during rotation. The counter-rotating movement minimizes the lateral translation of crop in the header. A surface feature 31, such as protuberances, dimples, knurling, ridges, or the like, may be provided on the exterior surfaces of the central shank portions 32, 42 to improve the threshing performance of the apparatus 20.

The pitch of the helical arrangement of the flight members 34, 44 is configured to match the crop being harvested. In the exemplar corn threshing header, the pitch of each flight member is approximately equal to the length of the corn ear entering the threshing apparatus. The taper diameters of the central shank portions 32, 42, the vertical spacing between the upper and lower arrays 300, 400, and the lateral spacing between adjacent conveyors is are preferably configured so that the open space between adjacent shank portions 32, 42 at the forward end of the threshing apparatus 20 is approximately the diameter of a corn ear containing kernels. As the ear progresses rearwardly though the threshing apparatus, the open space between adjacent shank portions 32, 42 at the rearward end of the threshing apparatus 20 is reduced, by the tapering of the shank portion, to slightly less than the diameter of a cob sans kernels. The decreasing open space separates the kernels from the cob whereupon the kernels are allowed to fall into the lower portion of the header 15. The cob and the remainder of the stalk are discharged from the rear of the header 15 after passing through the threshing apparatus 20.

A lateral collector 100 is provided beneath the lower array 400 to collect the grain/kernels falling from the threshing apparatus 20 and direct them to a central location for conveyance to a storage location. The lateral collector 100 preferably comprises one or more draper belts 105, 107 configured to deliver the collected grain toward a central location in the header for delivery to the harvester or other movable grain storage means.

A debris separator may be provided beneath the threshing apparatus and above the lateral collector 100 to reduce the volume of non-grain material being directed toward the storage location. Screens, sieves, air flow or other known methods for separating chaff and other non-grain debris from the grain to be collected may be employed. Alternatively, debris may be separated from the grain off the harvesting machine 10 when the grain is being transferred into storage. Elimination of a debris separator from the header reduces input power requirements and header weight which can reduce fuel consumption of the harvester.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural threshing header for harvesting a grain from a standing crop comprising:
    a cutting apparatus connected to a front end of the header and extending laterally across the header;
    a first plurality of screw crop conveyors connected to the header, positioned behind the cutting apparatus, and laterally spaced apart in an upper plane, each conveyor having a tapered shank portion arranged for rotation about a fore-aft axis and a fighting structure extending outwardly from the shank portion and helically arranged thereabout for urging crop aftward by conveyor rotation; and
    a second plurality of screw crop conveyors connected to the header, positioned behind the cutting apparatus, and laterally spaced apart in a lower plane, each conveyor having a tapered shank portion arranged for rotation about a fore-aft axis and a fighting structure extending outwardly from the shank portion and helically arranged thereabout for urging crop aftward by conveyor rotation;
    each conveyor further having a cylindrical boundary defined by rotation of the flighting, lateral spacing of the first and second pluralities of conveyors, respectively, causing overlap of cylindrical boundaries of laterally adjacent conveyors, vertical spacing between the first and second pluralities of conveyors causing overlap of cylindrical boundaries between vertically adjacent conveyors, the tapered shank portions reducing open space between adjacent conveyors in relation to aftward movement therebetween.

2. The threshing header of claim 1, wherein the fore-aft axes of the first plurality of conveyors are disposed in an upper plane and the fore-aft axes of the second plurality of conveyors are disposed in a lower plane, the lower plane being parallel to and below the upper plane.

3. The threshing header of claim 2, wherein the first plurality of conveyors rotate in a first direction and the second plurality of conveyors rotate in second direction opposite to the first direction.

4. The threshing header of claim 3, wherein a fore-aft length of the second plurality of conveyors is greater than a fore-aft length of the first plurality of conveyors and the second plurality of conveyors extend more forwardly than the first plurality of conveyors.

5. The threshing header of claim 4, further comprising a lateral collector disposed beneath the first and second pluralities of conveyors configured to convey grain toward a discharge location.

6. The threshing header of claim 1, wherein the cutting apparatus is configured to sever the standing crop along its full lateral extent.

7. The threshing header of claim 1, wherein the header is elevated such that a cutting apparatus height is thereby elevated to a vertical position proximately below a height of the grain to be harvested.

8. The threshing header of claim 7, wherein the cutting apparatus is a rotary cutter, a sicklebar, a continuous loop saw cutter, an air knife, or a water knife.

9. An agricultural threshing header for separating a grain from a standing crop comprising:
 a cutting apparatus connected to a front end of the header and extending laterally across the header; and
 a threshing apparatus connected to the header and positioned behind the cutting apparatus, said threshing apparatus having a plurality of screw crop conveyors arranged for rotation about an equal plurality of generally parallel and spaced-apart fore-aft axes, each conveyor having a tapered shank portion with a forward diameter and an aft diameter, the aft diameter being greater than the forward diameter, each conveyor further having a flight member extending outwardly from the shank portion helically arranged thereabout to urge crop from fore to aft upon rotation of the conveyor,
 the plurality of conveyors arranged into lateral upper and lower arrays, the conveyors positioned in the arrays so that flight members on adjacent conveyors overlap and open space between tapered shank portions on adjacent conveyors is reduced as the crop is urged aftward by the flight members, interaction between the crop and the shank portions separating the grain from the crop.

10. The threshing header of claim 9, wherein the plurality of conveyors in the upper array rotate in a first direction and the plurality of conveyors in the lower array rotate in second direction opposite to the first direction.

11. The threshing header of claim 10, wherein a fore-aft length of the plurality of conveyors in the lower array is greater than a fore-aft length of the plurality of conveyors in the upper array and the plurality of conveyors in the lower array extend more forwardly than the plurality of conveyors in the upper array.

12. The threshing header of claim 11, wherein the cutting apparatus is configured to sever the standing crop along its full lateral extent.

13. The threshing header of claim 12, wherein the header is elevated such that a cutting apparatus height is thereby elevated to a vertical position proximately below a height of the grain to be harvested.

14. The threshing header of claim 13, wherein the cutting apparatus is a rotary cutter, a sicklebar, a continuous loop saw cutter, an air knife, or a water knife.

15. The threshing header of claim 12, further comprising a lateral collector disposed beneath the threshing apparatus and configured to convey grain toward a discharge location.

* * * * *